(12) United States Patent
Abe et al.

(10) Patent No.: US 6,412,886 B1
(45) Date of Patent: Jul. 2, 2002

(54) DRIVING FORCE CONTROL APPARATUS AND METHOD FOR A VEHICLE

(75) Inventors: Yasushi Abe; Yoshihito Ito, both of Okazaki (JP)

(73) Assignee: Mitsubishi Jidosha Kogyo Kabushi Kaisha, Tokyo (JP)

( * ) Notice: Subject to any disclaimer, the term of this patent is extended or adjusted under 35 U.S.C. 154(b) by 0 days.

(21) Appl. No.: 08/412,187

(22) Filed: Mar. 28, 1995

(30) Foreign Application Priority Data

Apr. 7, 1994 (JP) .............................................. 6-069262
Jan. 20, 1995 (JP) .............................................. 7-007157

(51) Int. Cl.$^7$ .............................................. F02D 9/00
(52) U.S. Cl. ...................... 303/139; 303/141; 303/149; 303/196; 303/197; 180/197
(58) Field of Search ................................ 303/141, 140, 303/134, 143, 148, 149, 194, 195, 196, 113.2; 180/197; 364/426.03

(56) References Cited

U.S. PATENT DOCUMENTS

| 4,884,651 A | * 12/1989 | Harada et al. ............... 303/141 |
| 4,924,396 A | * 5/1990 | Fujioka ........................ 303/139 |
| 4,967,866 A | * 11/1990 | Maehara ...................... 303/139 |
| 5,002,148 A | * 3/1991 | Miyake et al. ............... 303/141 |
| 5,168,953 A | * 12/1992 | Naito .......................... 180/197 |
| 5,269,390 A | * 12/1993 | Glover et al. ................ 180/197 |
| 5,279,382 A | * 1/1994 | Iwata .......................... 303/139 |
| 5,295,552 A | * 3/1994 | Kageyama et al. .......... 303/141 |
| 5,329,453 A | * 7/1994 | Tsuyama et al. ............ 303/196 |
| 5,415,468 A | * 5/1995 | Latarnik et al. ............. 303/149 |

FOREIGN PATENT DOCUMENTS

| DE | 3821769 | 1/1990 |
| DE | 3836680 | 5/1990 |
| DE | 3916046 | 11/1990 |
| DE | 4017890 | 12/1991 |
| DE | 4212637 | 10/1992 |
| DE | 4243058 | 6/1993 |
| JP | 2252930 | 10/1990 |

* cited by examiner

Primary Examiner—Metthew C. Graham

(57) ABSTRACT

In a driving force control apparatus, a target driving torque $T_O$ is obtained based on a value determined by subtracting a feedback correction torque $T_F$ corresponding to a slip amount DVS from a correction reference torque $T_{BC}$ corresponding to a vehicle body speed $V_B$. Slip is suppressed by a throttle control so that the engine output is reduced to the target driving torque $T_O$. A retard command is output when the slip amount DVS and a slip rate GDVS are greater than predetermined values to retard an ignition timing of the engine, thereby suppressing an abrupt slip. When it is determined that a right and left front wheel speed difference is large and the vehicle is running on a split road, a retard command is made difficult to be reset as compared to a case where the vehicle is not running on a split road. When it is detected that the driving wheels are vibrating, particularly a differential factor is decreased and regulated only to a component to reduce the target driving torque. With the driving force control apparatus, when a slip occurs, the engine output is reduced to prevent vehicle body vibration during operation of a device to suppress a slip.

48 Claims, 6 Drawing Sheets

$V_{FX}$ : Average driving wheel speed
$V_{OT}$ : Target driving wheel speed
$V_B$ : Vehicle body speed

DRIVING FORCE CONTROL APPARATUS AND METHOD FOR A VEHICLE

FIELD OF THE INVENTION

The present application relates to a driving force control apparatus for a vehicle which, when driving wheels of the vehicle slip, reduces the driving force of the driving wheels to suppress slipping. Further, when the slip is suppressed, it restores the reduced driving force to the original value. This thereby prevents the speed variation of the driving wheels (fluctuation of rotational speed of the driving wheels) from vibrating and, in turn, prevents the vehicle body from vibrating.

BACKGROUND OF THE INVENTION

An excessive driving force when the vehicle is traveling on a slippery road such as a snow-laden road tends to cause a slip of the driving wheels. This results in a reduction of gripping force of the tires, acceleration characteristics and drivability. To deal with such a case, a conventional driving force control apparatus or a so-called traction control apparatus has been developed and practically used.

In the traction control apparatus, a slip of the driving wheels is detected (slip detection method will be described later) and, when the slip is considerable, the output of the engine is forcibly and rapidly suppressed to reduce the driving force of the driving wheels (driving force reduction method will be described later). As described above, the slip is suppressed by forcible reduction of the driving force to improve the starting and acceleration characteristics on a slippery road such as a snow-laden road.

When the traction control apparatus is applied to a two-wheel driving (2WD) vehicle, a slip amount DVS has been detected as follows. For a front wheel driving vehicle, for example, first a target driving wheel speed $V_{OT}$ (this is in one to one relation to a vehicle body speed $V_B$) is calculated based on the rear wheel (driven wheels) speed. Then, speeds of the right and left front wheels (driving wheels) are averaged to determine an average driving wheel speed $V_{FX}$. The target driving wheel speed $V_{OT}$ is then subtracted from the average driving wheel speed $V_{FX}$ to detect the slip amount.

Further, a control device for reducing the engine output (driving force) to suppress a slip includes the following:

(1) Throttle control (throttle valve of the intake system is closed)
(2) Ignition timing retard control (ignition timing of the ignition plug is retarded)
(3) Fuel control (fuel cutting or fuel injection amount control)
(4) Cylinder number control (operation of a predetermined number among plural cylinders is suspended).

Most of the conventional traction control apparatuses use a combination of the throttle control and the ignition timing retard control. According to the throttle control, the engine output can be controlled smoothly and over a wide range. In an abrupt start or when the road surface condition suddenly changes from a dry road to a frozen road, an abrupt slip occurs. The throttle control is not able to control such an abrupt slip. When an abrupt and excessive slip occurs, the ignition timing retard control is temporarily operated to suppress the abrupt slip with a good response.

In a traction control apparatus using a combination of the throttle control and the ignition timing retard control, setting (control begins to reduce the driving force) and resetting (control ends to restore the driving force) of the both controls are performed as follows.

First, setting and resetting conditions of the ignition timing retard control will be described. In the ignition timing retard control, setting and resetting are made in dependence on the conditions of the slip amount DVS and a slip rate GDVS which is obtained by differentiation of the slip amount DVS. That is, the control is set when both the slip amount DVS and the slip rate GDVS are greater than predetermined values. It is reset when one of the slip amount and the slip rate GDVS is decreased to some extent, and the other is considerably reduced. In practice, these are made as follows, wherein G indicates the gravitational acceleration.

The ignition timing retard control is set when both conditions (1-1) and (1-2) shown below are simultaneously met:

(1-1) Slip amount $DVS \geq 2$ [km/h]
(1-2) Slip rate GDVS>0.6 G.

The setting is made when the slip amount DVS and the slip rate GDVS are both greater than the predetermined values.

The ignition timing retard control is reset when both conditions (2-1) and (2-2), or (3-1) and (3-2), shown below are simultaneously met:

(2-1) $-0.5\ G \geq GDVS \geq 0\ G$; and
(2-2) DVS<6 [km/h] or
(3-1) GDVS<-0.5 G; and
(3-2) DVS<18 [km/h].

The above (2-1) and (2-2) are conditions where the slip rate GDVS is decreased to some extent and the slip amount DVS is considerably decreased. The above (3-1) and (3-2) are conditions where the slip amount DVS is decreased to some extent and the slip rate GDVS is considerably decreased.

Next, setting and resetting conditions of the throttle control will be described. In the throttle control, the throttle control is set when the slip amount DVS is greater than a preset value. It is reset when the slip amount DVS is smaller than a preset value. The steps are as follows.

Details will be described in the embodiments of the present invention. To achieve slip suppression control by the throttle control, first a reference driving torque $T_B$ to maintain a vehicle body speed $V_B$ is calculated, and feedback correction torque $T_F$ which is a cause of the occurrence of a slip is calculated based on the slip amount DVS. The feedback correction torque is $T_F$ is determined by PID (proportional, integration, differentiation) calculating the slip amount DVS. Therefore, by subtracting the feedback correction torque $T_F$ from the engine output torque, the slip amount DVS can be reduced. Then, the feedback correction torque $T_F$ which is a cause of slip occurrence is subtracted from the reference driving torque $T_B$ to determine the target driving torque $T_O$. This thereby reduces the engine output torque to the target driving torque $T_O$. By reducing the engine output to the target driving torque $T_O$, that is, by suppressing an excessive torque which is a cause of slip occurrence, slip occurrence is suppressed. As the torque reduction device in this case, the previously described fuel control or cylinder number control can be used instead of the throttle control.

In a vehicle using the traction control apparatus, when traveling, for example, on a split road (a road surface where the frictional coefficient of the road surface is different between the right and left wheel, that is, where one side road surface is the ground and the other side is snow-laden or frozen), a high vehicle body vibration may occur. The vehicle body vibration can be broadly divided into the following two causes.

Initially, a first cause of vehicle body vibration will be described.

When a driving force control apparatus (traction control apparatus) in which the target driving wheel speed $V_{OT}$ is decreased from an average driving wheel speed $V_{OT}$ to determine the slip amount DVS, and setting and resetting of the ignition timing retard control are made according to the above conditions (1-1), (1-2), (2-1), (2-2), (3-1) and (3-2) is used on a 2WD vehicle, and when the vehicle travels on a split road (a road surface where the frictional coefficient of the road surface contacting the driving wheels differs between the right and left wheel), a high vehicle body vibration may occur.

The cause of occurrence of the high vehicle body vibration will be described with reference to FIG. 6. When the vehicle travels on a split road, a single-wheel slip condition may occur where only one of the right and left driving wheels slips. In such a single-wheel slip condition, for example, since the left driving wheel slips whereas the right driving wheel does not slip, the average driving wheel speed $V_{FX}$ abruptly increases. Thus, the on-board computer outputs a retard command to make the ignition timing retard control. When the ignition timing retard control is made, and the target driving wheel speed $V_{OT}$ is made, the ignition timing retard control is ended. If the road surface is still in a split condition even after the ignition timing retard control ends, a single wheel slip occurs again. Further, the average driving wheel speed $V_{FX}$ again abruptly increases to make the ignition timing retard control. Then, the ignition timing retard control is ended. Such operation is repeated to output a plurality (e.g. 7) of retard commands in a short time (e.g. 1 second), and the ignition timing retard control is carried out in a hunting condition.

When the ignition timing retard control is carried out in a hunting condition as described above, a hunting phenomenon occurs where speed fluctuation of the driving wheels is vibrating. The vibration of the driving wheels is transmitted through the transmission system to the engine. In particular in a manual transmission using a gear mechanism, vibration of the driving wheels is liable to be transmitted to the engine as compared to an automatic transmission using a hydromatic torque converter. When the period of the vibration transmitted to the engine is close to the natural frequency of the engine and both frequencies are resonant with each other, the engine strongly vibrates, resulting in a high vehicle body vibration.

Since the engine is mounted on the chassis through an elastic material such as rubber, it is liable to vibrate. Further, since it is heavy in weight, only one vibration results in a high vehicle vibration occurring.

Next, a second cause of vehicle body vibration will be described.

When the vehicle travels on a split road or the like, one driving wheel contacting a low-friction road surface such as a snow-laden road may lose resistance, and the other driving wheel contacting high-friction, normal road surface may have a high resistance. In such a condition, by the function of the differential gear, in an extreme case, only one driving wheel with no resistance is rotated, and the other driving wheel with a resistance is not supplied with the driving force. That is, a strong driving force is transmitted to only one driving wheel. When a strong driving force is transmitted to only one driving wheel, a torsional force is generated and the speed of one driving wheel is rapidly increased. Further, vibration due to the torsional force and the rapid increase in the driving wheel speed acts upon the spring resonant system such as suspension, resulting in an even higher vibration. The vibration and torsional force are transmitted to the driving wheels.

Further, in a vehicle using a manual transmission with a gear mechanism, the above-described torsional force and the vibration is amplified by the spring resonant system and are transmitted to the engine to vibrate the engine. Moreover, vibration of the engine is returned to the driving wheels through the transmission, propeller shaft, and differential gear. Ultimately, the torsional force and vibration of the spring resonant system are directly transmitted to the driving wheels, and the engine vibration caused by the vibration of the spring resonant system and the like are returned and transmitted. As a result, the rotational speed of the driving wheels vibratingly fluctuates.

When the rotational speed of the driving wheels vibratingly fluctuates, the value of the slip amount DVS also vibratingly fluctuates. This is because the vibratingly fluctuating average driving wheel speed is subtracted from the target driving wheel speed (corresponding to the vehicle body speed) to obtain the slip amount DVS.

When the value of the slip amount DVS vibratingly fluctuates, the value of the feedback correction torque $T_F$, which is obtained by PID calculation of the slip amount DVS, largely vibratingly fluctuates. Of the components of the feedback correction torque $T_F$, particularly the value of a component obtained by differentiation largely fluctuates in positive and negative directions.

When the value of the feedback correction torque $T_F$ largely vibratingly fluctuates, the value of the target driving torque $T_O$, obtained by subtracting the feedback correction torque $T_F$ from the reference driving torque $T_B$, also vibratingly fluctuates.

In the traction control apparatus, the output torque is controlled so that the engine output is equal to the target driving torque $T_O$. However, if the target driving torque vibratingly fluctuates, the output torque also vibratingly fluctuates. This results in a high vehicle body vibration.

When the engine output (torque) is attempted to be reduced for slip suppression during traveling on a split road, fluctuation of the driving wheel speed becomes vibrating. A technology which prevents vibration by adjusting the control gain to reduce the proportion of torque reduction is also disclosed in Japanese Patent Laid-open Publication 2-252930. However, this technology has the following problems.

(1) When traveling on a split road is detected, since the control gain is reduced not only in the torque increasing direction but also in the torque reducing direction, the response of the objective slip reduction control also tends to be decreased.

(2) Further, since the above control is made only when traveling on a split road, it cannot appropriately deal with a vibration actually occurring due to another cause at a position other than a split road.

SUMMARY OF THE INVENTION

To eliminate the above prior art problems, a primary object of the present invention is to provide a driving force control apparatus and method which enables traveling of a vehicle while suppressing a slip without causing vehicle body vibration even on a split road.

The present invention which attains the above object is based on a technical concept wherein a driving force control apparatus, when the driving wheels slip, suppresses the driving force transmitted from the driving wheels to the road surface, and restores the driving force to the normal condition when the slip is removed. Further, when the road is a split road, and the driving force is once reduced due to a slip, restoration of the driving force becomes difficult even when the slip becomes decreased.

The present invention which attains the above object is also based on a technical concept wherein a driving force control apparatus, when the driving wheels slip, suppresses the driving force transmitted from the driving wheels to the road surface, and restores the driving force to the normal condition when the slip is removed. Further, when a vibration of the driving wheels occurs, variation of the driving force is restricted. More particularly, in the above-mentioned situation, a variation to increase the driving force is restricted.

In the driving force control apparatus according to the present invention, even when the driving wheels slip on a split road, the driving force of the driving wheels is reduced, and the slip becomes small. The reduction of the driving force of the driving wheels is further continued, thereby preventing a hunting condition and, in turn, a vehicle body vibration due to hunting.

Further, in the driving force control apparatus of the present invention, since variation of the driving force is restricted when the driving wheels vibrate, the driving force does not vary in a short time and occurrence of a vehicle body vibration can be prevented.

There is further provided according to the present invention a driving force control method comprising the steps of:
(a) detecting a slip condition amount generated in the driving wheels of the vehicle;
(b) controlling a driving force, transmitted from the driving wheels to the road surface, to be reduced based upon the slip condition amount detected in step (a) to suppress a slip of the driving wheels;
(c) detecting whether or not the vehicle is in the condition that a vibration occurs in at least one of the driving wheels; and
(d) inhibiting control to restore the reduced driving force upon detecting the existence of a vibration in step (c).

In one aspect of the present invention, in an operation condition where vibration occurs in the driving wheels, by regulating the control of the control device in the direction to restore the driving wheel reduced by the control device, the once reduced driving wheel becomes difficult to increase. This thereby suppresses vibration of the driving wheels and prevents the occurrence of vehicle body vibration.

Further, on the other hand, since the control of the control device is not regulated in the direction to reduce the driving force, a slip in the driving wheels can be converged in the case where no vibration occurs in the driving wheels.

In another aspect of the present invention, traveling on a split road is detected to determine that vibration occurs in the driving wheels. Since a split road can positively be detected from a rotational speed difference between the right and left driving wheels, the operation condition can also be positively determined.

In yet another aspect of the present invention, the control device ends the control of the driving force control device when the slip condition amount meets a predetermined end determination condition, or begins control of the driving force control device when the slip condition amount meets a predetermined start determination condition. The control regulation device makes ending of the control hard or starting control easy, which effectively reduces occurrence of vibration in the driving wheels or creates an early entrance in a condition where occurrence of vibration in the driving wheels is suppressed, thereby preventing occurrence of vehicle body vibration.

In a further aspect of the present invention, the driving force control device controls the ignition timing of the engine to rapidly reduce the driving force.

In a still further aspect of the present invention, the driving force control device controls the ignition timing of the engine. Specifically, the control device which ends the control to retard the ignition timing when the slip condition amount meets a predetermined end determination condition, or starts the control to retard the ignition timing when the slip condition amount meets a predetermined start determination condition, makes it hard to end the control or easy to begin the control. This effectively reduces occurrence of vibration in the driving wheels or makes early entrance in a condition where occurrence of vibration in the driving wheels is suppressed, thereby preventing occurrence of vehicle body vibration. That is, the ignition timing of the engine is controlled so that the control to adjust the driving has a good response but, in a condition where vibration occurs, the ignition timing is regulated to retard the response, thereby remarkably reducing the vehicle body vibration. Ultimately, since driving force control with good response is made possible by controlling the ignition timing, and the control is regulated in the driving force increasing direction, even with control of good response, vehicle body vibration caused by hunting where end and restart of control are repeated can be prevented.

In yet a further aspect of the invention, the driving force control is achieved by a combination of the ignition timing control and the intake air amount control which is moderate in response compared to the ignition timing control. When vibration occurs in the driving wheels, a slip is rapidly suppressed by the ignition timing control with good response. Further, when vibration of the driving wheels is converged, the ignition timing control is regulated. This thereby prevents the occurrence of hunting due to the ignition timing control and obtains an appropriate driving force by the intake air amount control. Further, in the ignition timing control, since the retard angle control is made hard to be ended, end and restart of retarding is not repeated on a split road, and much stabler control is achieved.

In yet a still further aspect of the present invention, when the rotational speed of the driving wheels vibrates, the variation period of the rotational speed is in a predetermined range, or the variation amplitude of the rotation speed exceeds a predetermined value, the driving wheels running on a split road are determined to be vibrating. This thereby easily and exactly detects vibration of the driving wheels.

In even a further aspect of the present invention, restoration of the engine output is restricted. More specifically, restoration of the target driving torque is restricted to prevent vibration of the driving wheels positively.

In even a still further aspect of the invention, when the target driving torque is set by correcting the reference driving torque by the correction torque, reduction of the correction torque is limited. Since the correction torque is related directly to vehicle body vibration, by suppressing the reduction of the correction torque, the occurrence of vehicle body vibration can be directly prevented.

In this case, by limiting the differential correction torque which sharply varies, the occurrence of vehicle body vibration can be rapidly prevented. Further, by limiting the differential correction torque to a positive value, only the control in the direction to reduce the vehicle body vibration is made.

In a further aspect of the present invention, easy reduction of the driving force is permitted by closing the throttle valve.

In a still further aspect of the present invention, in an operation condition where vibration occurs in the driving wheels, a change in driving force which is controlled by the control device is regulated by the control regulation device and vibration of the driving force is suppressed to prevent the occurrence of vehicle body vibration.

In yet a further aspect of the present invention, the driving wheels are determined to be vibrating when a vibration occurs in the rotational speed of the driving wheels, the variation period of the rotational speed is in a predetermined range, or the variation amplitude of the rotational speed is more than a predetermined value. This thereby easily and exactly detects vibration of the driving wheels.

In yet an even further aspect of the present invention, changes in the engine output are restricted. More specifically, a change in the target driving torque is restricted to prevent vibration of the driving wheels positively.

In still an even further aspect of the present invention, when the target driving torque is set by correcting the reference driving torque by the correction torque, variation of the correction torque is limited. Since the correction torque is related directly to vehicle body vibration, by suppressing the variation of the correction torque, the occurrence of vehicle body vibration can be directly prevented.

In this case, by limiting the differential correction torque which sharply varies, the occurrence of vehicle body vibration can be effectively and rapidly prevented.

Finally, in yet a still further aspect of the present invention, the driving torque can be easily reduced by closing the throttle valve.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Preferred embodiments of the present invention will now be described with reference to the drawings. Of the individual embodiments, since part of construction of the intake system, engine system, and control system, construction of the torque control unit and calculation is common, the common parts will first be described.

Figure 1:
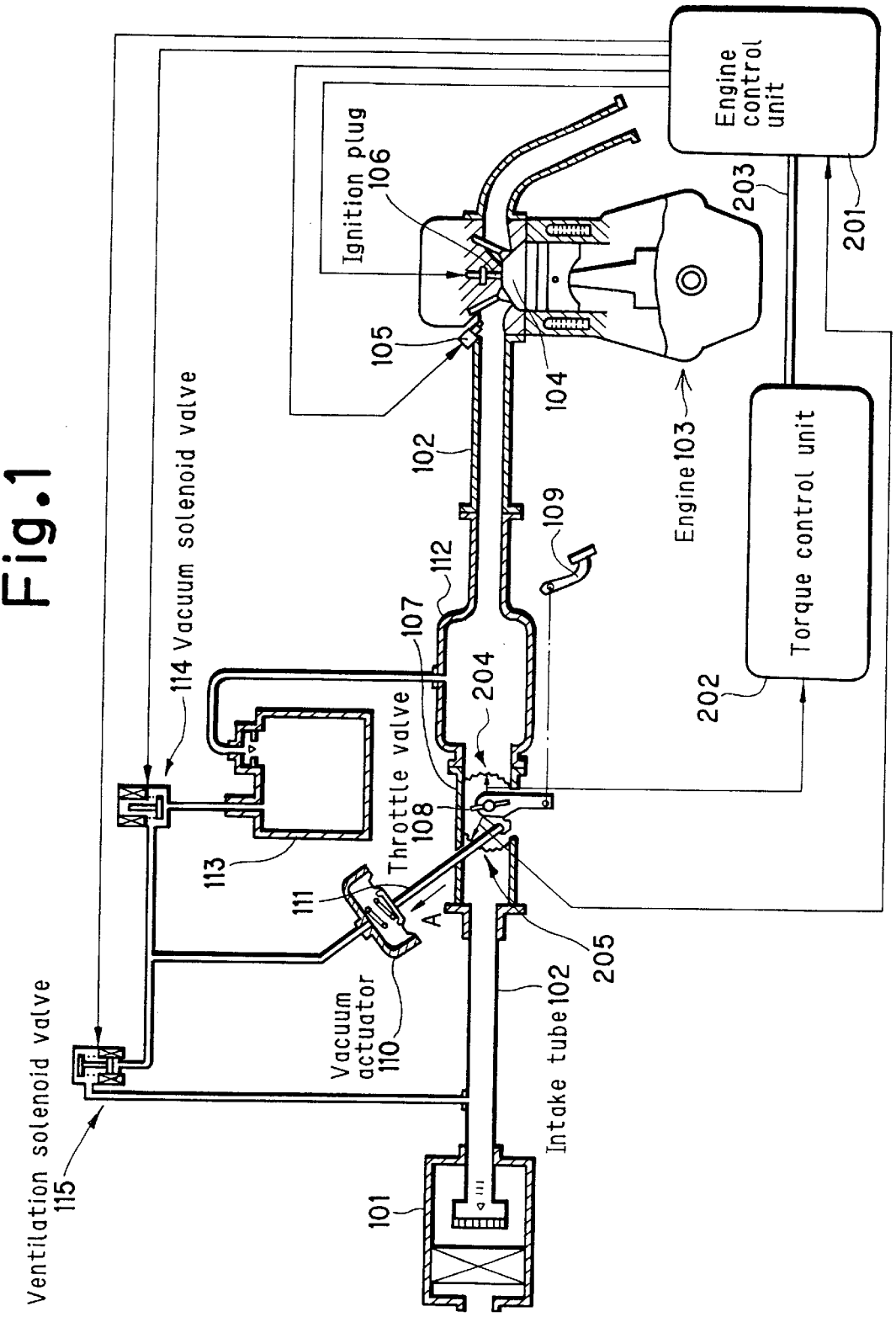
FIG. 1 is a schematic view showing the construction of an intake system, an engine system, and a control system of a vehicle to which the driving force control apparatus according to an embodiment of the present invention is applied.

The intake system, engine system, and control system of an embodiment in which the present invention is applied to a front-wheel driving type vehicle will first be described with reference to FIG. 1. Referring to FIG. 1, air is fed to a combustion chamber 104 of an engine 103 through an air cleaner 101 and an intake tube 102. The combustion chamber 104 is also fed with fuel injected from an injection valve 105, and the mixture in the combustion chamber 104 is then combusted by ignition of an ignition plug 106.

A throttle body 107 is disposed halfway in the intake tube 102, and a throttle valve 108 for adjusting the amount of the intake air is rotatably disposed in the throttle body 107. When an acceleration pedal 109 is pressed down, the throttle valve 108 is rotated in an open direction and, when the foot is separated from the acceleration pedal 109, the throttle is returned to a full close condition by a force of a spring. On the other hand, when a control rod 111 is pulled in the direction of the arrow A by a vacuum actuator 110, the throttle valve 108 is forcibly closed according to the pulling amount of the control rod 111. Operation of the vacuum actuator 110 will be described later.

A surge tank 112 communicates at the downstream of the throttle body 107, and the surge tank 112 communicates with a vacuum tank 113. On the other hand, a vacuum solenoid valve 114 is disposed between the vacuum tank 113 and the vacuum actuator 110, and a ventilation solenoid valve 115 is disposed between a section of the intake tube 102 (part of nearly the atmospheric pressure) close to the air cleaner 101 and the vacuum actuator 110.

The vacuum solenoid valve 114 is closed when unenergized and opened when energized. On the contrary, the ventilation solenoid valve 115 is opened when unenergized and closed when energized. The vacuum actuator 110 pulls the control rod 111 to the direction A when the inner pressure is negative, and when the inner pressure is at the atmospheric pressure, the control rod 111 is returned to a predetermined position by a spring incorporated in the vacuum actuator 110. Thus, the energizing condition of the solenoid valves 114 and 115 and the operation of the vacuum actuator 110 are summarized as follows.

(1) The solenoid valves 114 and 115 are both unenergized. The inner pressure of the vacuum actuator 110 is at the atmospheric pressure. The control rod 111 is at a position defined by the incorporated spring.

(2) The solenoid valves 114 and 115 are both energized. The inner pressure of the vacuum actuator 110 is at a negative pressure. The control rod 111 is pulled in the direction A.

The pulling position in the direction A of the control rod 111 is controlled by duty controlling the current in the solenoid valves 114 and 115 to determine the movement in the direction A of the control rod 111 according to the duty ratio.

Here, open/close operation of the throttle valve 108 is summarized.

(1) When the duty ratio of the current to the solenoid valves 114 and 115 is 0%, and the control rod 111 of the vacuum actuator 110 is at a position defined by the spring, the throttle valve 108 is opened in a one to one correspondence to the depression amount of the acceleration pedal 109.

(2) When the solenoid valves 114 and 115 are energized to pull the control rod 111 in the direction A, the throttle valve 108 is forcibly closed independent of the amount of pressing down of the acceleration pedal 109. The closing amount of the throttle valve 108 is in response to the current duty ratio to the solenoid valves 114 and 115.

An engine control unit 201 can forcibly close the throttle valve 108 by controlling the current supplied to the solenoid valves 114 and 115. This reduces the output of the engine 103.

Further, the engine control unit 201 can also adjust the ignition timing of the ignition plug 106, and the output of the engine 103 can be reduced by retarding the ignition angle.

Further, the engine control unit 201 also adjusts the amount of fuel injected from the injection valve 105.

A torque control unit 202 is connected to the engine control unit 201 by a communication cable 203. The engine control unit 202 sends an engine condition signal to the torque control unit 202, and the torque control unit 202 sends information on the target driving torque (the calculation method will be described later) and a retarding ratio of the ignition timing to the engine control unit 201.

The torque control unit 202 receives signals from an accelerator opening sensor 204 and various sensors (details will be described later) to make a determination of a slip, determination of a split road, a calculation of the target driving torque, and a calculation of the retarding ratio as will be described later. On the other hand, the engine control unit 201 receives information from sensors such as a throttle opening sensor 205 and the torque control unit 202 to control output of the engine 103. Particularly for forcible reduction of the engine output, the engine control unit 201 increases the duty ratio of the solenoid valves 114 and 115 and retards the ignition timing of the ignition plug 106.

Next, the construction and calculation procedures in the torque control unit 202 and the peripheral sensors will be described with reference to FIG. 2.

Figure 2:
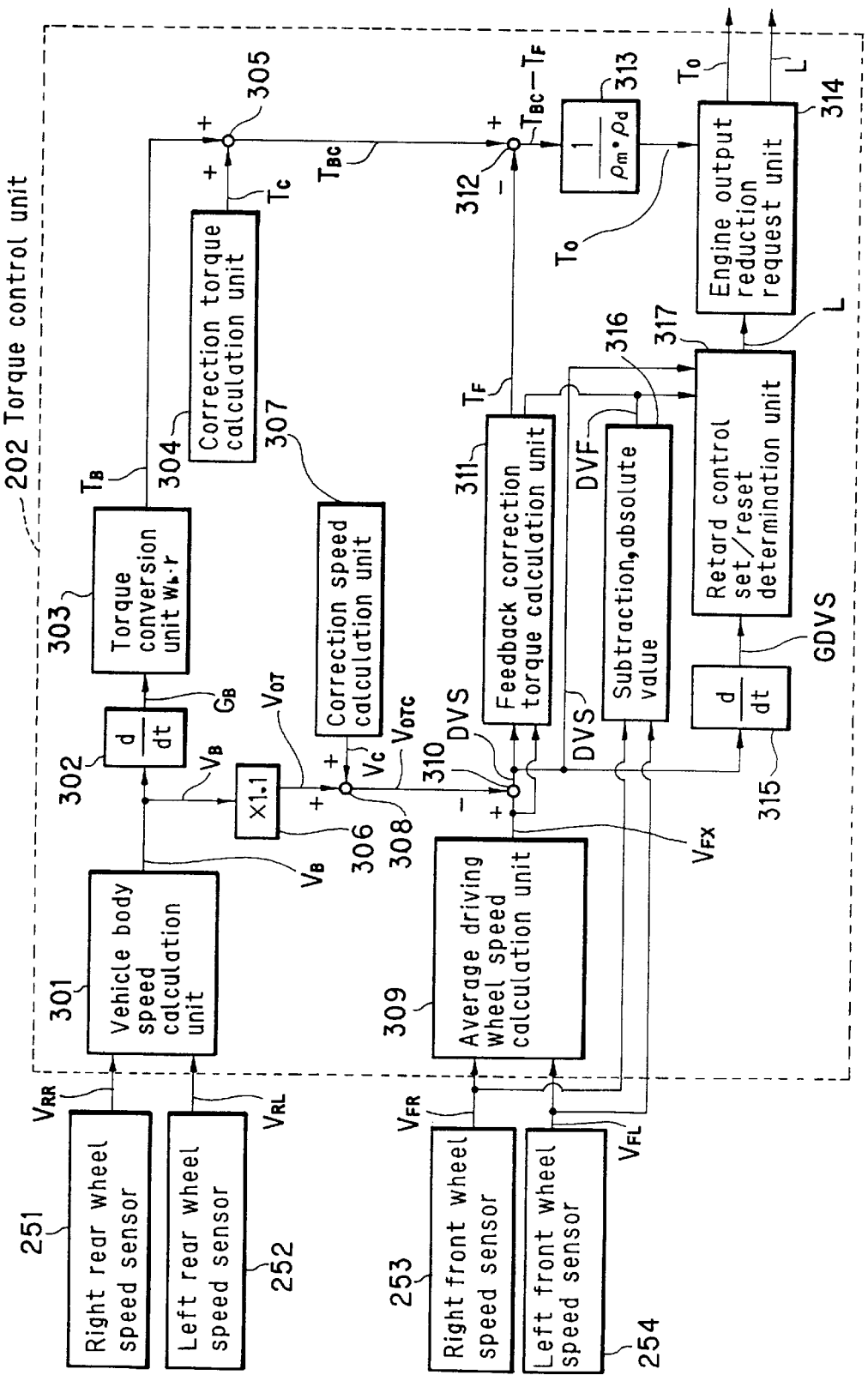
FIG. 2 is a block diagram showing a torque control unit used in the present embodiment.

As shown in FIG. 2, the torque control unit 202 is connected with a right rear wheel speed sensor 251, a left rear wheel speed sensor 252, a right front wheel speed sensor 253, a left front wheel speed sensor 254, and various other sensors (not shown). The right rear wheel speed sensor 251 detects a right rear wheel speed $V_{RR}$, the left rear wheel speed sensor 252 detects a left rear wheel speed $V_{RL}$, the right front wheel speed sensor 253 detects a right front wheel speed $V_{FR}$, and the left front wheel speed sensor 254 detects a left front wheel speed $V_{FL}$.

A vehicle body speed calculation unit 301 of the torque control unit 202 multiplies the right rear wheel speed $V_{RR}$ and the left rear wheel speed $V_{RL}$ by a weighting coefficient and then averages the results to determine the vehicle body speed $V_B$. A differentiation unit 302 differentiates the vehicle body speed $V_B$ to determine a longitudinal acceleration $G_B$ along the straight running direction of the vehicle. A torque conversion unit 303 multiplies the longitudinal acceleration $G_B$ by a vehicle body weight $W_b$ and an effective tire radius $r$ of the front wheels to determine the reference driving torque $T_B$. A correction torque calculation unit 304 determines a correction torque $T_C$, and adds the correction torque $T_C$ to the reference driving torque $T_B$ by an addition unit 305 to determine a correction reference driving torque $T_{BC}$. The above correction torque $T_C$ is a sum of a running resistance and a cornering drag torque. The running resistance is determined from data mapped in memory which tends to increase as the vehicle body speed increases, and increase as the turning angle of the steering shaft increases.

On the other hand, a multiplication unit 306 multiplies the vehicle body speed $V_B$ by a constant (1.1) to determine the target driving wheel speed $V_{OT}$. The value 1.1 of the constant has been determined based on the following findings. That is, the value has been determined in consideration of the fact that drivability and acceleration characteristics are improved when, during traveling of a vehicle, the front wheels (driving wheels) make a slip of about 10% relative to the road surface.

A correction speed calculation unit 307 determines a correction speed $V_C$. The correction speed $V_C$ is determined by subtracting a turning correction value from an acceleration correction value. The acceleration correction value is determined from data mapped in memory which tends to increase in steps as the value of the longitudinal acceleration $G_B$ increases. A turning correction speed is also determined from data mapped in memory which tends to increase as the value of a lateral acceleration (corresponding to the speed difference between the right and left rear wheels) increases.

An addition unit 308 adds the correction speed $V_C$ to the target driving wheel speed $V_{OT}$ to determine a correction target driving wheel speed $V_{OTC}$.

An average driving wheel speed calculation unit 309 averages the right front wheel speed $V_{FR}$ and the left front wheel speed $V_{FL}$ to determine an average driving speed $V_{FX}$. A subtraction unit 310 subtracts the correction target driving speed $V_{OTC}$ from the average driving wheel speed $V_{FX}$ to determine the slip amount DVS.

A feedback correction torque calculation unit 311 makes a proportional calculation by multiplying the slip amount by a proportional coefficient to determine a basic proportional correction torque which is proportional to the slip amount; an integral calculation by integrating the slip amount to determine an integral correction torque which corresponds to a gradual variation of the slip amount; and a differential calculation by differentiating the slip amount to determine a differentiation correction torque which corresponds to a rapid change in slip amount. Further, the proportional correction torque, the integral correction torque, and the differential correction torque are summed to determine a feedback correction torque $T_F$. Changing the calculation procedure to determine the feedback correction torque $T_F$ in response to the operation condition is one of the key points of the present invention, of which details will be described later. The feedback correction torque calculation unit 311 is input with the average driving wheel speed $V_{FX}$ and a split speed DVF which will be described later.

A subtraction unit 312 subtracts the feedback correction torque $T_F$ from a correction reference driving torque $T_{BC}$. Further, a division calculation unit 313 divides the torque $(T_{BC}-T_F)$ by a total reduction ratio $\rho_m \cdot \rho_d$ (for a manual transmission) to determine the target driving torque $T_O$. $\rho_m$ is a transmission speed change ratio, $\rho_d$ is a differential gear reduction ratio. For an automatic transmission, the total reduction ratio is $\rho_m \cdot \rho_d \cdot \rho_T$ in consideration of the torque converter ratio $\rho_T$.

The target driving torque $T_O$ corresponds to a value obtained by subtracting the feedback correction torque $T_F$ (this corresponds to a torque to induce a slip) from the reference driving torque $T_B$ (this corresponds to a torque to maintain the vehicle body speed $V_B$). Therefore, slip is suppressed by reducing the engine output to the target driving torque $T_O$. The target driving torque $T_O$ is transmitted to an engine output reduction request unit 314.

On the other hand, a differentiation unit 315 differentiates the slip amount DVS to determine the slip rate GDVS. A subtraction/absolute value calculation unit determines a split speed DVF indicating the absolute value of the difference $|V_{FR}-V_{FL}|$ of the right front wheel speed $V_{FR}$ and the left front wheel speed $V_{FL}$.

A retard control set/reset determination unit 317 is previously set with a condition to set the ignition timing retard control and a condition to reset the control. The determination unit 317 sets and resets the ignition timing retard control based on the set/reset conditions, the slip amount DVS, the slip rate GDVS, and the split speed DVF. When set, the determination unit 317 outputs a retard command to the engine output reduction request unit 314 and, when reset, stops outputting the retard command.

The set/reset conditions set in the retard control set/reset determination unit 317 are one of the key points of the present invention, of which details will be described later.

The engine output reduction request unit 314, when the traction control switch is turned on by the driver to select the traction control, transmits the target driving torque $T_O$ and the retard command L to the engine control unit 201.

The engine control unit 201 controls the current duty ratio in the solenoid valves 114 and 115 to forcibly close the throttle valve 108 so that the output of the engine 103 is the target driving torque $T_O$. Further, the engine control unit 201 retards the ignition timing of the ignition plug 106 in response to the retard command L. Thus, the occurrence of a slip can be suppressed by reducing the engine output torque.

Initially, the first preferred embodiment of the present application will be described. In the first preferred embodiment, the set condition and the reset condition set in the retard control set/reset determination unit 317 are changed as follows.

The ignition timing retard control is set to output the retard command L when the following (11-1) and (11-2) are simultaneously met:

(11-1) Slip amount DVS$\geq$2 [km/h]; and (11-2) Slip rate GDVS>0.6 G.

That is, the set conditions (11-1) and (11-2) are the same as the conventional set conditions (1-1) and (1-2).

The ignition timing retard control is reset to stop outputting the retard command L when the following (12-1), (12-2) and (12-3), or (13-1), (13-2) and (13-3), or (14-1) and (14-2) are simultaneously met.

(12-1) −0.5 G$\geq$GDVS$\geq$0 G (12-2) DVS<6 [km/h]

(12-3) DVF=$|V_{FR}-V_{FL}|$<15 [km/h]

(13-1) GDVS<−0.5 G (13-2) DVS<18 [km/h]

(13-3) DVF=$|V_{FR}-V_{FL}|$<15 [km/h].

The above conditions (12-3) and (13-3) are conditions to determine that the road is not to be a split road because the difference between the right and left front wheel speeds (driving wheel speeds) is smaller than a predetermined value (e.g. 15 km/h, this is greater than the right and left wheel speed difference generated during rapid turning). The conditions (12-1) and (12-2) are the same as the conventional conditions (2-1) and (2-2), and the conditions (13-1) and (13-2) are the same as the conventional conditions (3-1) and (3-2). Therefore, when not traveling on a split road, the ignition timing retard control is reset in conditions the same as the conventional conditions.

(14-1) DVS<3 [km/h]

(14-2) DVF=$|V_{FR}-V_{FL}|$>15 [km/h].

The above condition (14-2) is to determine the vehicle to be traveling on a split road. In other words, the condition (14-2) is to determine a split road because DVF is greater than a maximum rotational speed difference between the right and left driving wheels generated when the vehicle turns in a condition where a slip is not substantially generated in the driving wheels during acceleration or retardation of the vehicle. When traveling on a split road, as shown by the condition (14-2), the ignition timing retard control is not reset unless the slip amount is smaller than 3 [km/h], and the retard control is hard to be reset compared to not traveling on a split road (see formulae (12-2) and (13-2). That is, when traveling on a split road, the ignition timing retard control is performed over an extended period of time.

Figure 3A:
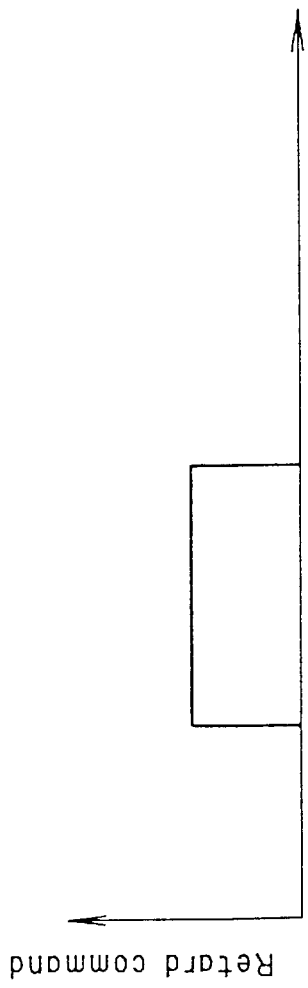
FIGS. 3A and 3B are diagrams showing control characteristics of the present invention.
Figure 3B:
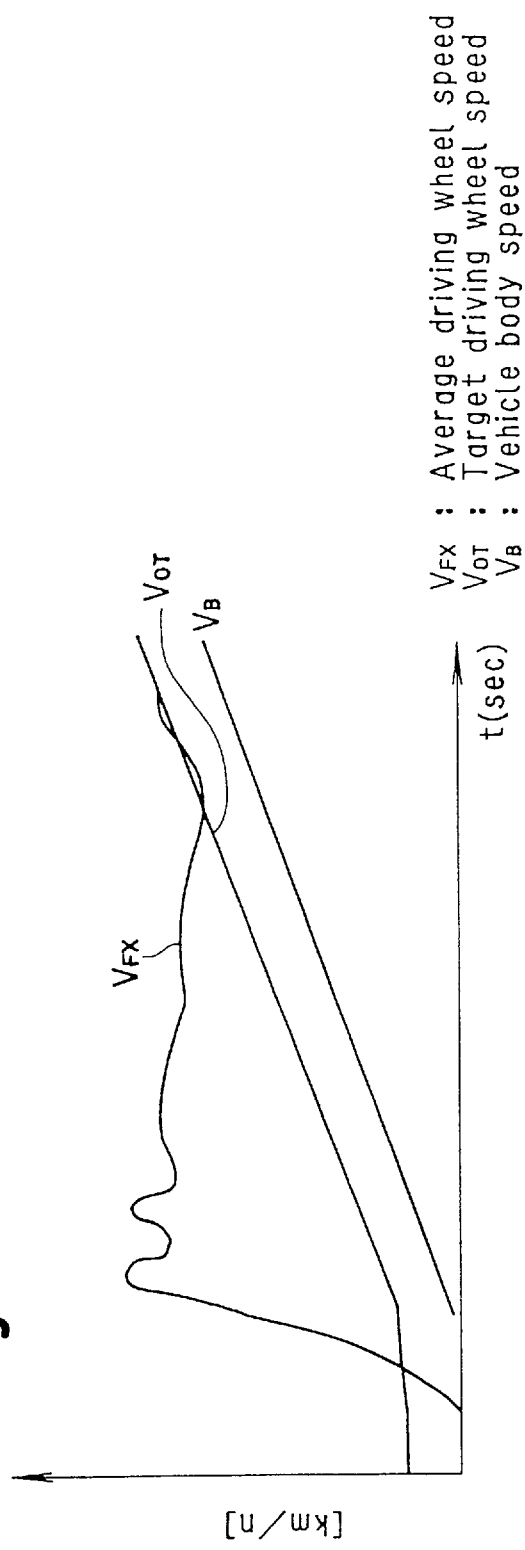

FIGS. 3A and 3B show conditions when traveling on a split road in an embodiment applied with the above conditions (12-1) to (14-2). As shown in FIGS. 3A and 3B, in the present embodiment, the retard control is made hard to be reset (conditions (14-1) and (14-2)), and the retard control will never be made in a hunting condition. Therefore, vehicle body vibrations due to the retard control in a hunting condition do not occur. On the other hand, when a slip occurs, the engine output is suppressed, and the slip control effect is maintained.

Next, various modifications of the first preferred embodiment will be described.

While the above first embodiment is directed to a driving force control apparatus using a combination of (1) the throttle control and (2) the ignition timing retard control, alternatively, the present embodiment can also be applied to a driving force control device using (3) the fuel control or (4) the cylinder number control instead of the ignition timing retard control, in which the controls (3) and (4) are made difficult to be reset when traveling on a split road.

In the first embodiment, the set conditions (11-1) and (11-2) are the same as the conventional set conditions (1-1) and (1-2), but the set conditions may be set so that the controls are easier to be set than the conventional conditions. This can reduce the driving force earlier to achieve slip reduction preferentially. That is, in the first embodiment a slip is reduced while securing the acceleration of the vehicle but, when traveling on a split road where one wheel tends to undergo racing, it is preferable to make slip reduction as in the present modification example for rapidly reducing a slip.

Alternatively, the condition (14-1) may be changed to make the retard control harder to be reset.

Further, it may be modified to make it easier to enter (set) the driving force reduction control, and harder to go out (reset) from the driving force reduction control.

While, in the first embodiment, the retard command L is immediately reduced to zero when the reset conditions are met FIGS. 3A and 3B, the retard command L may be gradually reduced after the reset conditions are met to gradually restore the retard angle. This gradually restores the engine output torque, thereby making the preventing vehicle body vibration more efficient.

Next, a second preferred embodiment of the present application will be described. In the second preferred embodiment, the feedback correction torque calculation unit 311 is improved. The second preferred embodiment will be described with reference to FIG. 4 showing details of the feedback correction torque calculation unit 311.

Figure 4:
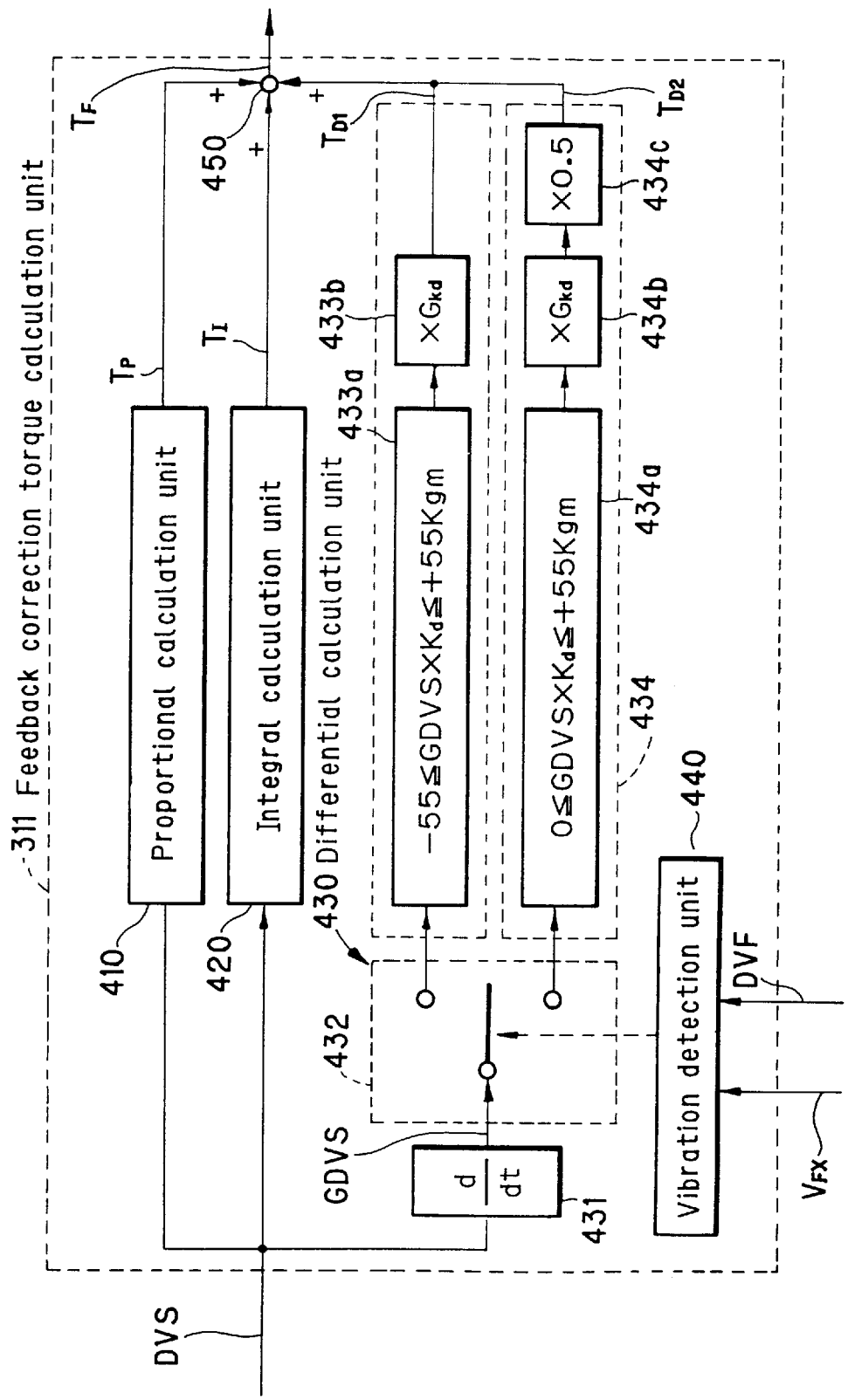
FIG. 4 is a block diagram showing a feedback correction torque calculation unit used in the embodiments.

As shown in FIG. 4, the feedback correction torque calculation unit 311 includes a proportional calculation unit 410, an integral calculation unit 420, a differential calculation unit 430, a vibration detection unit 440, and an addition calculation unit 450.

Of these units, the differential calculation unit 430 includes a differentiation unit 431, a selection unit 432, a first clip calculation unit 433, and a second clip calculation unit 434. Further, the first clip calculation unit 433 includes a clip unit 433a and a multiplication unit 433b. The second clip calculation unit 434 includes a clip unit 434a, a multiplication unit 434b, and a correction multiplication unit 434c. The first clip calculation unit 433 has been used in the conventional technology, but the present embodiment newly incorporates the second clip calculation unit 434.

The proportional calculation unit 410 makes proportional calculation of the slip amount DVS to determine a proportional correction torque $T_P$. The integral calculation unit 420 integrates the slip amount DVS to determine an integral correction torque $T_I$.

In the differential calculation unit 430, the differentiation unit 431 differentiates the slip amount to determine the slip rate GDVS. The selection unit 432 transmits the slip rate GDVS to the first clip calculation unit 433 or the second clip calculation unit 444 according to a selection command by the vibration detection unit 440. Details of the selection operation will be described later.

The first clip calculation unit 433, when the slip rate GDVS is input, makes clip calculation shown by Formula (1) on the slip rate GDVS by the clip unit 433*a*. It further multiplies the clip calculation value by a coefficient $G_{Kd}$ by the multiplication unit 433*b* to determine a first differential correction torque $T_{D1}$.

$$-55 \text{ [kgm]} \leq \text{GDVS} \times K_d \leq 55 \text{ [kgm]} \quad (1)$$

where $K_d$ is a coefficient.

The second clip calculation unit 434, when the slip rate GDVS is input, makes clip calculation shown by Formula (2) on the slip rate GDVS by the clip unit 434*a*. It further multiplies the clip calculation value by the coefficient $G_{Kd}$ and a correction coefficient 0.5 by the multiplication unit 434*b* and the correction multiplication unit 434*c* to determine a second differential correction torque $T_{D2}$.

$$0 \leq \text{GDVS} \times Kd \leq 55 \text{ [kgm]} \quad (2)$$

where $K_d$ is a coefficient.

The addition unit 450 adds the proportional correction torque $T_P$, the integral correction torque $T_I$, and one of the differential correction torque $T_{D1}$ and the differential correction torque $T_{D2}$ to determine the feedback correction torque $T_F$, which is output.

Figure 5:
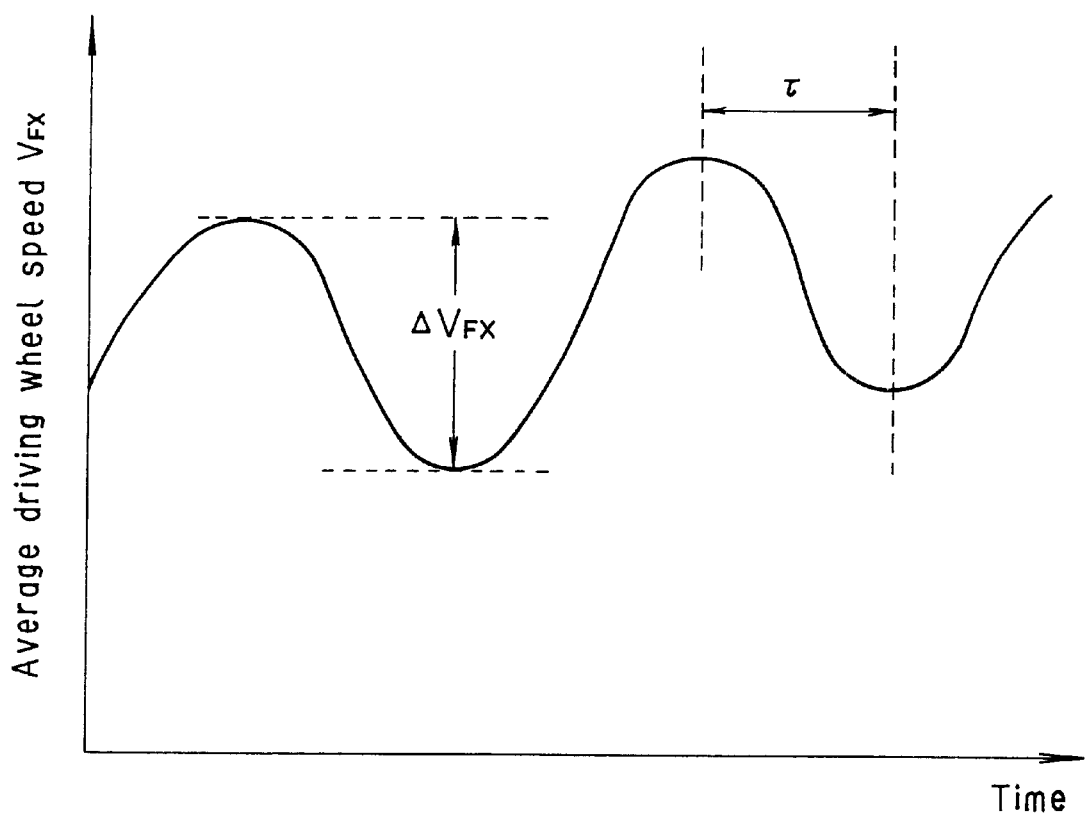
FIG. 5 is a diagram showing variation period and variation amplitude.
Figure 6A:
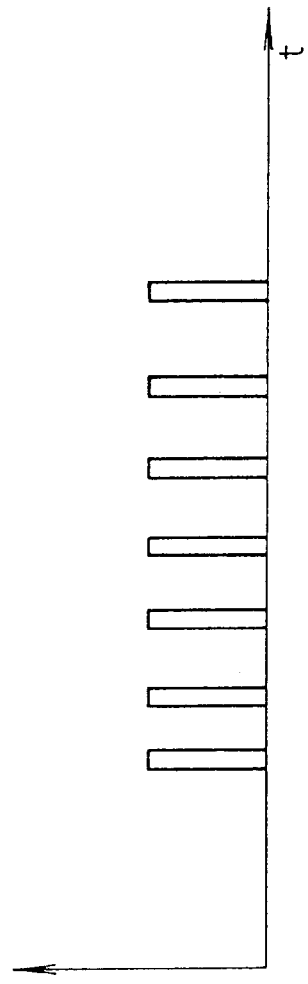
FIGS. 6A and 6B are diagrams showing prior art control characteristics.
Figure 6B:
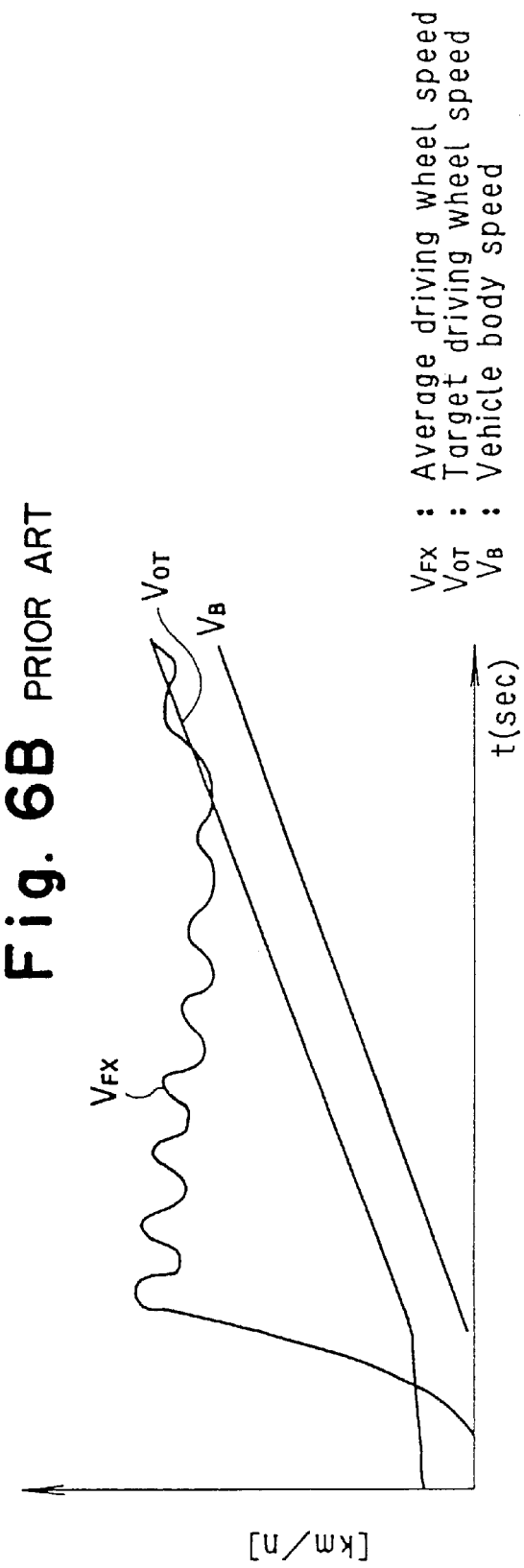

The vibration detection unit 440 is input with the split speed DVF ($=V_{FR}-V_{FL}$) and the average driving wheel speed $V_{FX}$. The vibration detection unit 440 determines a variation period $\tau$ and a variation amplitude $\Delta V_{FX}$ of the average driving wheel speed $V_{FX}$ at every control period (for example, 10 [ms] (FIG. 5). The variation period $\tau$ is a time that the value of the average driving wheel speed $V_{FX}$ takes to vary from the upper peak to the lower peak. Further, the variation amplitude $\Delta V_{FX}$ is a value measured from the upper peak to the lower peak of the average driving wheel speed $V_{FX}$.

The vibration detection unit 440 is set with set/reset conditions shown below.
Set Conditions
  (21-1) 40 [ms]$\geq \tau \geq$160 [ms]
  (21-2) $\Delta V_{FX} \geq 2$ [km/h]
Reset Conditions
  (22-1) $\tau < 40$ [ms]
  (22-2) $\tau > 160$ [ms]
  (22-3) $\Delta V_{FX} < 2$ [km/h]
Set Condition
  (31-1) DVF$\geq 12$ [km/h]
Reset Condition
  (32-1) DVF$< 12$ [km/h]

When a condition that (21-1) which is the condition where the variation period $\tau$ falls within a predetermined range and (21-2), which is the condition where the variation amplitude $\Delta V_{FX}$ is greater than a predetermined value, are simultaneously met continues for three control periods (e.g. 30 [ms]), it is determined that the rotational speed of the driving wheels is actually vibratingly varying (this is called as "the driving wheels are vibrating"), and the set state is established.

When at least one of the three conditions of (22-1) and (22-2), which are conditions where the variation period $\tau$ falls within a predetermined range, and (22-3), which is a condition where the variation amplitude $\Delta V_{FX}$ is smaller than a predetermined value, is met, it is determined that the driving wheels are vibrating, and the reset state is established.

When the condition (31-1) where the split speed DVF is greater than a predetermined value is determined, it is determined that the vehicle is running on a split road. Since vibration of the driving wheels is liable to occur when the vehicle is traveling on a split road, the set state is established.

When the condition (31-2) where the split speed DVF is smaller than a predetermined value is determined, it is determined that the vehicle is as not running on a split road. Since vibration of the driving wheels is not liable to occur when the vehicle is not traveling on a split road, the reset state is established.

When a condition where the conditions (21-1) and (21-2) are simultaneously met continues for three control periods and the set state is established, the selection unit 432 makes a selection operation to transmit the slip rate GDVS to the second clip calculation unit 434. After the set state is established by the satisfaction of the conditions (21-1) and (21-2), when at least one of the reset conditions (22-1), (22-2) and (22-3) is met and the reset state established, the selection unit 432 makes a selection operation to transmit the slip rate GDVS to the first clip calculation unit 433.

When the condition (31-1) is met and the set state is established, the selection unit 432 makes a selection operation to transmit the slip rate GDVS to the second clip calculation unit 434. When the reset condition (31-2) is met and the reset state is established after the set state is established by the satisfaction of the condition (31-1). the selection unit 432 makes a selection operation to transmit the slip rate GDVS to the first clip calculation unit 433.

Ultimately, when the driving wheels are actually vibrating ((21-1), (21-2)), or when the vehicle is traveling on a split road where vibration of the driving wheels is liable to occur, the differential correction torque $T_{D2}$ output from the second clip calculation unit 434 is adopted as a differential correction torque. The differential correction torque $T_{D2}$ is small in value compared to the differential correction torque $T_{D1}$ output from the first clip calculation unit 433, and has only a positive component which increases the feedback correction torque $T_F$ to reduce the target driving torque $T_O$ (that is, slip suppression).

That is, since, in the second clip calculation unit 434, 0.5 is multiplied by the correction multiplication unit 434*c,* the value of the differential correction torque $T_{D2}$ can be reduced, only a positive component is output by the clip unit 434*a,* and the value of the differential correction torque can have only a positive component value.

When the driving wheels are vibrating, the value of the slip rate GDVS repeats a rapid increase or rapid decrease, and its polarity sharply swings between positive and negative. However, the differential correction torque $T_{D2}$ output from the second clip calculation unit 434 is small in value and has only a positive component. Therefore, the value of the target driving torque $T_O$, which is determined by subtracting the feedback correction torque $T_F$ from the reference driving torque $T_B$, stabilizes without large vibration. This thereby prevents the occurrence of vehicle body vibration.

When, as in the conventional system, the second clip calculation unit 434 is not present, and only the first clip calculation unit 433 is present as a clip calculation unit, if the driving wheels vibrate, the value of the differential correction torque $T_{D1}$ by the first clip calculation unit 433 sharply increases and decreases while swinging between positive and negative. This sharply varies the value of the target driving torque $T_O$ resulting in vehicle body vibration.

When the driving wheels are not vibrating ((22-1), (22-2), (22-3)), or when the vehicle is not traveling on a split road ((31-2)), the differential correction torque $T_{D1}$ output from the first clip calculation unit 433 is adopted as a differential correction torque, thereby enabling rapid and stable slip suppression control.

Next, various modifications of the second preferred embodiment will be described.

The second embodiment is a driving force control apparatus using a combination of (1) the throttle control and (2) the ignition timing retard control. However, alternatively, the embodiment can also be applied to a driving force control apparatus using (3) the fuel control or (4) the cylinder number control instead of the ignition timing retard control, in which the control (3) or (4) is made difficult to be discontinued when traveling on a split road.

In the second embodiment, a limitation is made to the differential correction torque when the driving wheels are vibrating. However, alternatively, a limitation may also be made to the driving torque increasing direction on other correction torques such as proportional correction torque. Since the differential correction torque has the best response to a change in slip, it is most effective to make a limitation to the differential correction torque.

In the second clip calculation unit 434 of the second embodiment, the lower limit of the clip range of the clip unit 434a is zero (Formula (2)). However, the lower limit may be a negative value close to zero. In this case, the effect is slightly decreased compared to limitation to a positive value. This is better, however, in that the occurrence of driving wheel vibration can be suppressed compared to use of no limitation.

Further, the value (less than 1) multiplied in the correction multiplication unit 434c may be varied.

Of course, the control over the retard command by the first preferred embodiment and the control over the feedback correction torque $T_F$ of the second preferred embodiment may be simultaneously made. Additionally, aspects of the first embodiment may be combined with aspects of the second embodiment.

Further, setting the retard command (outputting the retard command) and resetting the retard command (discontinuing output of the retard command) in the retard control set/reset determination unit 317, which are the control objects in the first embodiment, may be made by the set/reset conditions (21-1), (21-2), (22-1), (22-2), (22-3), (31-1) and (31-2) used in the second embodiment.

Still further, setting action (sending the slip rate GDVS to the second clip calculation unit 434 to use the differential correction torque $T_{D2}$) and resetting action (sending the slip rate GDVS to the first clip calculation unit to use the differential correction torque $T_{D1}$) in the feedback correction torque calculation unit 311, which are the control objects in the second embodiment, may be made by the set/reset conditions (11-1), (11-2), (21-1), (12-2), (12-3), (13-1), (13-2), (13-3), (14-1) and (14-2) used in the first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving force control apparatus for a vehicle comprising:
   slip detection means for detecting a slip condition amount indicating a magnitude of a slip condition generated in driving wheels of the vehicle when starting or accelerating the vehicle;
   driving force control means for controlling a driving force transmitted from the driving wheels to a road surface;
   operation condition detection means for detecting an operation condition of the vehicle wherein a vibration occurs in the driving wheels;
   control means for controlling said driving force control means according to the slip condition amount detected by said slip detection means to reduce the driving force and suppress a slip of the driving wheels; and
   control regulation means for limiting an increase of the driving force, when said operation condition detection means detects the condition wherein a vibration occurs in the driving wheels, which is reduced by said control means, so that the increasing of the reduced driving force is made difficult,
   wherein said operation condition detection means determines the operation condition of the vehicle wherein a vibration occurs in the driving wheels when the vehicle is detected as traveling on a split road where frictional coefficients of the road surface contacting right and left driving wheels of the vehicle are different, and wherein said operation condition detection means includes rotational speed difference detection means for detecting a rotational speed difference between the right and left driving wheels; and
   split road determination means for determining that the vehicle is traveling on the split road when the rotational speed difference detected by said rotational speed difference detection means is greater than a predetermined value.

2. The driving force control apparatus of claim 1, wherein the predetermined value is a value greater than a maximum rotational speed difference between the right and left driving wheels that could be generated by a turn of the vehicle in a situation wherein no slip is occurring in the driving wheels.

3. The driving force control apparatus of claim 2, wherein said control means ends the control of said driving force control means when the slip condition amount detected by said slip detection means satisfies a predetermined end determination condition; and
   said control regulation means varies control parameters by changing the end determination condition so as to make ending of the control relatively more difficult.

4. The driving force control apparatus of claim 3, wherein said control means begins the control of said driving force control means when the slip condition amount detected by said slip detection means satisfies a predetermined start determination condition; and
   said control regulation means changes the start determination condition so as to make starting of the control easier than the starting of the control when an operation condition of the vehicle exists wherein vibration in the driving wheels does not occur.

5. The driving force control apparatus of claim 4, wherein said control regulation means increases a difference between the start determination condition and the end determination condition based upon detection of the existence of the operation condition of the vehicle wherein vibration occurs in the driving wheels by said operation condition detection means.

6. The driving force control apparatus of claim 1, wherein said driving force control means controls an ignition timing of an engine equipped on the vehicle.

7. The driving force control apparatus of claim 6, wherein said control means reduces the driving force by retarding an angle of the ignition timing, and ends the angle retardation when the detected slip condition amount satisfies a predetermined end determination condition; and said control regulation means varies control parameters by changing the end determination condition so as to make ending of the angle retardation relatively more difficult.

8. The driving force control apparatus of claim 7, wherein said control means starts the control of said driving force control means when the slip condition amount detected by said slip detection means satisfies a predetermined start determination condition; and said control regulation means changes the start determination condition so as to make the control easy to be started when the operation condition of the vehicle, wherein vibration occurs in the driving wheels, is detected by said operation condition detection means.

9. The driving force control apparatus of claim 8, wherein said control regulation means increases a difference between the start determination condition and the end determination condition when the operation condition of the vehicle, wherein vibration occurs in the driving wheels, is detected by said operation condition detection means.

10. The driving force control apparatus of claim 1, wherein said driving force control means includes ignition timing control means for controlling an ignition timing of an engine of the vehicle and intake air amount control means for controlling an intake air amount of the engine; wherein said control means controls said ignition timing control means and said intake air amount control means; and said control regulation means regulates to the ignition timing control by said control means.

11. The driving force control apparatus of claim 10, wherein said control means reduces the driving force by retarding an angle of the ignition timing, and ends the angle retardation when the detected slip condition amount satisfies a predetermined end determination condition; and said control regulation means varies control parameters by changing the end determination condition so as to make ending of the angle retardation relatively more difficult.

12. The driving force control apparatus of claim 1, wherein said operation condition detection means determines that the operation condition of the vehicle is in the condition, wherein vibration occurs in the driving wheels, when occurrence of actual vibration in the driving wheels is determined.

13. The driving force control apparatus of claim 12, wherein said operation condition detection means includes driving wheel speed detection means for detecting a rotational speed of the driving wheels, and wherein the operation condition of the vehicle is determined as being in the condition wherein vibration occurs in the driving wheels, when the rotational speed of the driving wheels detected by the driving wheel speed detection means is vibrating.

14. The driving force control apparatus of claim 13, wherein said operation condition detection means determines that the operation condition of the vehicle is in the condition, wherein vibration occurs in the driving wheels when a variation period of the rotational speed of the driving wheels detected by said driving wheel speed detection means is within a predetermined range.

15. The driving force control apparatus of claim 13, wherein said operation condition detection means determines that the operation condition of the vehicle is in the condition, wherein vibration occurs in the driving wheels, when a variation period of the rotational speed of the driving wheels detected by said driving wheel speed detection means is within a predetermined range and a variation amplitude of the rotational speed of the driving wheels is at least equal to a predetermined amplitude.

16. The driving force control apparatus of claim 13, wherein said operation condition detection means determines that the vehicle is in the operation condition, wherein vibration occurs in the driving wheels, when at least one of a determination of an actual vibration in the driving wheels and a determination that the vehicle is running on a split road differing in frictional coefficients of the road surface contacting the right and left driving wheels of the vehicle, occurs.

17. The driving force control apparatus of claim 1, wherein said driving force control means controls the output of an engine equipped on the vehicle; and said control regulation means restricts restoration of the engine output reduced by said control means.

18. The driving force control apparatus of claim 17, wherein said driving force control means is a throttle valve disposed in an intake passage of the engine.

19. The driving force control apparatus of claim 17, wherein said control means comprises:

target driving torque setting means for setting a target value of a driving torque required for reducing a slip of the driving wheels as a target driving torque according to the slip condition amount detected by said slip detection means; and engine control means for changing the engine output by controlling said driving force control means according to the target driving torque set by said target driving torque setting means.

20. The driving force control apparatus of claim 19, wherein said control regulation means restricts an increase in the target driving torque set by said target driving torque setting means.

21. The driving force control apparatus of claim 20, wherein said target driving torque setting means includes acceleration detection means for detecting a running acceleration of the vehicle;

reference driving torque setting means for setting a driving torque required for the vehicle to run at a running acceleration according to the running acceleration detected by said acceleration detection means as a reference driving torque;

correction torque setting means for setting a correction torque as a driving torque reduction amount required to reduce a slip of the driving wheels according to the slip condition amount detected by said slip detection means; and correction means for correcting the reference driving torque set by said reference driving torque setting means by the correction torque set by the correction torque setting means to set the target driving torque wherein said control regulation means restricts a decrease in the correction torque set by said correction torque setting means.

22. The driving force control apparatus of claim 21, wherein said correction torque setting means sets the correction torque by multiplying the slip condition amount detected by said slip detection means or a value according to the slip condition amount by a predetermined conversion coefficient; and said control regulation means varies control parameters by changing the conversion coefficient to a smaller value when said operation condition detection means detects the operation condition of the vehicle, wherein vibration occurs in the driving wheels.

23. The driving force control apparatus of claim 22, wherein said correction torque setting means includes at least differential correction torque setting means for setting a differential correction torque by multiplying a differentiated value of the slip condition amount detected by said slip detection means by the conversion coefficient.

24. The driving force control apparatus of claim 21, wherein said correction torque setting means includes at least differential correction torque setting means for setting a differential correction torque varying in response to a differentiated value of the slip condition amount detected by said slip detection means, wherein said control regulation means regulates the differential correction torque set by said differential correction torque setting means.

25. The driving force control apparatus of claim 24, wherein said correction torque setting means sets the differential correction torque in a range between a lower limit value having a predetermined negative value and an upper limit value having a predetermined positive value; and said control regulation means varies control parameters by varying the lower limit value used in said differential correction torque setting means so as to approach the upper limit value when said operation condition detection means detects the operation condition of the vehicle, wherein vibration occurs in the driving wheels.

26. The driving force control apparatus of claim 24, wherein said control regulation means restricts the differential correction torque set by said differential correction torque setting means to a positive value when said operation condition detection means detects the operation condition of the vehicle, wherein vibration occurs in the driving wheels.

27. A driving force control apparatus for a vehicle comprising:

slip detection means for detecting a slip condition amount indicating the magnitude of a slip condition generated in driving wheels when starting or accelerating the vehicle;

driving force control means for controlling an output of an engine equipped on the vehicle to control a driving force transmitted from the driving wheels to a road surface;

vibration detection means for detecting occurrence of a vibration in the driving wheels, said vibration detection means including driving wheel speed detection means for detecting a rotational speed of the driving wheels, defining generation of a vibration in the driving wheels when a vibration is generated in the rotational speed of the driving wheels;

control means including target driving torque setting means for setting a target value of a driving torque required to reduce a slip in the driving wheels as a target driving torque according to the slip condition amount detected by said slip detection means, and engine control means for controlling said driving force control means according to the target driving torque set by said target driving torque setting means, to reduce the engine output and suppress a slip of the driving wheels; and control regulation means for restricting a change in the driving force by said control means when said vibration detection means detects occurrence of a vibration in the driving wheels, wherein said target driving torque setting means includes acceleration detection means for detecting a running acceleration of the vehicle, reference driving torque setting means for setting a driving torque required for the vehicle to run at a running acceleration according to the running acceleration detected by said acceleration detection means as a reference driving torque, correction torque setting means for setting a correction torque as a driving torque reduction amount required to reduce a slip of the driving wheels according to the slip condition amount detected by said slip detection means, and correction means for correcting the reference driving torque set by said reference driving torque setting means by the correction torque set by the correction torque setting means to set the target driving torque, said control regulation means restricting the correction torque set by said correction torque setting means.

28. The driving force control apparatus of claim 27, wherein said vibration detection means determines that the driving wheels are vibrating when a variation period of the rotational speed of the driving wheels detected by said driving wheel speed detection means is within a predetermined range.

29. The driving force control apparatus of claim 27, wherein said vibration detection means determines that the driving wheels are vibrating when a variation period of the rotational speed of the driving wheels detected by said driving wheel speed detection means is within a predetermined range and a variation amplitude of the rotational speed of the driving wheels is at least equal to a predetermined amplitude.

30. The driving force control apparatus of claim 27, wherein said control regulation means restricts a change in the target driving torque set by said target driving torque setting means.

31. The driving force control apparatus of claim 27, wherein said correction torque setting means includes at least differential correction torque setting means for setting a differential correction torque varying in response to a differentiated value of the slip condition amount detected by said slip detection means, wherein said control regulation means restricts the differential correction torque set by said differential correction torque setting means.

32. The driving force control apparatus of claim 27, wherein said correction torque setting means sets the correction torque by multiplying the slip condition value detected by said slip detection means or a value according to the slip condition value by a predetermined conversion coefficient; and the conversion coefficient is changed to a smaller value when said vibration detection means determines the occurrence of vibration in the driving wheels.

33. The driving force control apparatus of claim 32, wherein said correction torque setting means includes at least differential correction torque setting means for setting a differential correction torque by multiplying a differentiated value of the slip condition amount detected by said slip detection means by the conversion coefficient.

34. The driving force control apparatus of claim 27, wherein said driving force control means is a throttle valve disposed in an intake passage of an engine of the vehicle.

35. A driving force control method comprising the steps of:
   (a) detecting a slip condition amount generated in the driving wheels of the vehicle;
   (b) controlling a driving force, transmitted from the driving wheels to the road surface, to be reduced based upon the slip condition amount detected in step (a) to suppress a slip of the driving wheels;
   (c) detecting whether or not a vibration occurs in at least one of the driving wheels of the vehicle; and
   (d) inhibiting control to increase the reduced driving force upon detecting the existence of a vibration in step (c), wherein step (c) includes the substeps of,
      (c1) determining that the vehicle is traveling on a split road if frictional coefficients of the road surface contacting right and left driving wheels of the vehicle are different, and
      (c2) detecting that a vibration occurs based upon the detection that the vehicle, in step (c1), is traveling on a split road, wherein step (c1) includes the substeps of,
         detecting rotational speeds of the right and left driving wheels of the vehicle; and
         detecting that the vehicle is running on the split road upon detecting that a difference of the detected rotational speeds of the right and left driving wheels of the vehicle is greater than a predetermined value.

36. The driving force control method of claim 35, wherein the predetermined value is greater than a maximum rotational speed difference between right and left driving wheels that could be generated during a turn of a vehicle in a situation wherein no slip is occurring in the driving wheels.

37. The driving force control method of claim 35, further comprising the step of
   (e) controlling the previously reduced driving force to be increased upon the detected slip condition amount of step (a) satisfying a predetermined end condition.

38. The driving force control method of claim 37, wherein step (d) includes varying the predetermined end condition to make step (e) relatively more difficult, upon detecting existence of a vibration in step (c).

39. The driving force control method of claim 35, wherein an ignition timing of an engine of the vehicle is controlled to control driving force.

40. The driving force control method of claim 39, wherein the driving force is reduced in step (b) by retarding an angle of the ignition timing upon the slip amount detected in step (a), and is increased by ending the angle retardation, satisfying a predetermined end condition.

41. The driving force control method of claim 35, wherein step (c) includes the substeps of:
   (c1) detecting rotational speeds of the right and left driving wheels of the vehicle; and
   (c2) detecting the occurrence of a vibration based upon a detection of a vibration in the rotational speeds of step (c1).

42. The driving force control method of claim 41, wherein existence of a vibration is detected in step (c2) based upon a detection of a variation period of the detected rotational speeds of the left and right driving wheels being within a predetermined range.

43. The driving force control method of claim 41, wherein the existence of a vibration is detected in step (c2) based upon a detection of a variation period of the detected rotational speeds of the left and right driving wheels being within a predetermined range and based upon a detection of a variation amplitude of the detected rotational speeds being at least equal to a predetermined amplitude.

44. The driving force control method of claim 35, wherein an output of an engine of the vehicle is controlled to control the driving force.

45. The driving force control method of claim 44, wherein control in step (b) includes the substeps of,
   (b1) setting a target value of a driving torque required for reducing a slip of the driving wheels as a target value of driving torque according to the detected slip condition amount of step (a), and
   (b2) changing the engine output by controlling the driving force according to the target driving torque set in step (b1).

46. The driving force control method of claim 45, wherein step (d) includes restricting an increase in the target driving torque set in step (b1).

47. The driving force control method of claim 46, wherein the setting of the target driving torque in step (b1) further includes the substeps of,
   detecting a running acceleration of the vehicle,
   setting a driving torque required for the vehicle to run at the detected running acceleration as a reference driving torque,
   setting a correction torque as a driving torque reduction amount to reduce a slip of the driving wheels according to the detected slip condition amount of step (a), and
   correcting the set reference driving torque by the set correction torque to thereby set the target driving torque in step (b1), wherein
   step (d) includes restricting a decrease in the set correction torque.

48. The driving force control method of claim 47, wherein the correction torque set in the substep of (b1) includes setting the correction torque by multiplying the detected slip condition amount of step (a), or a value derived from the slip condition amount detected in step (a), by a predetermined conversion coefficient, wherein step (d) includes changing the coefficient amount to a relatively smaller value upon detecting occurrence of a vibration in step (c).

* * * * *